Figure 1:
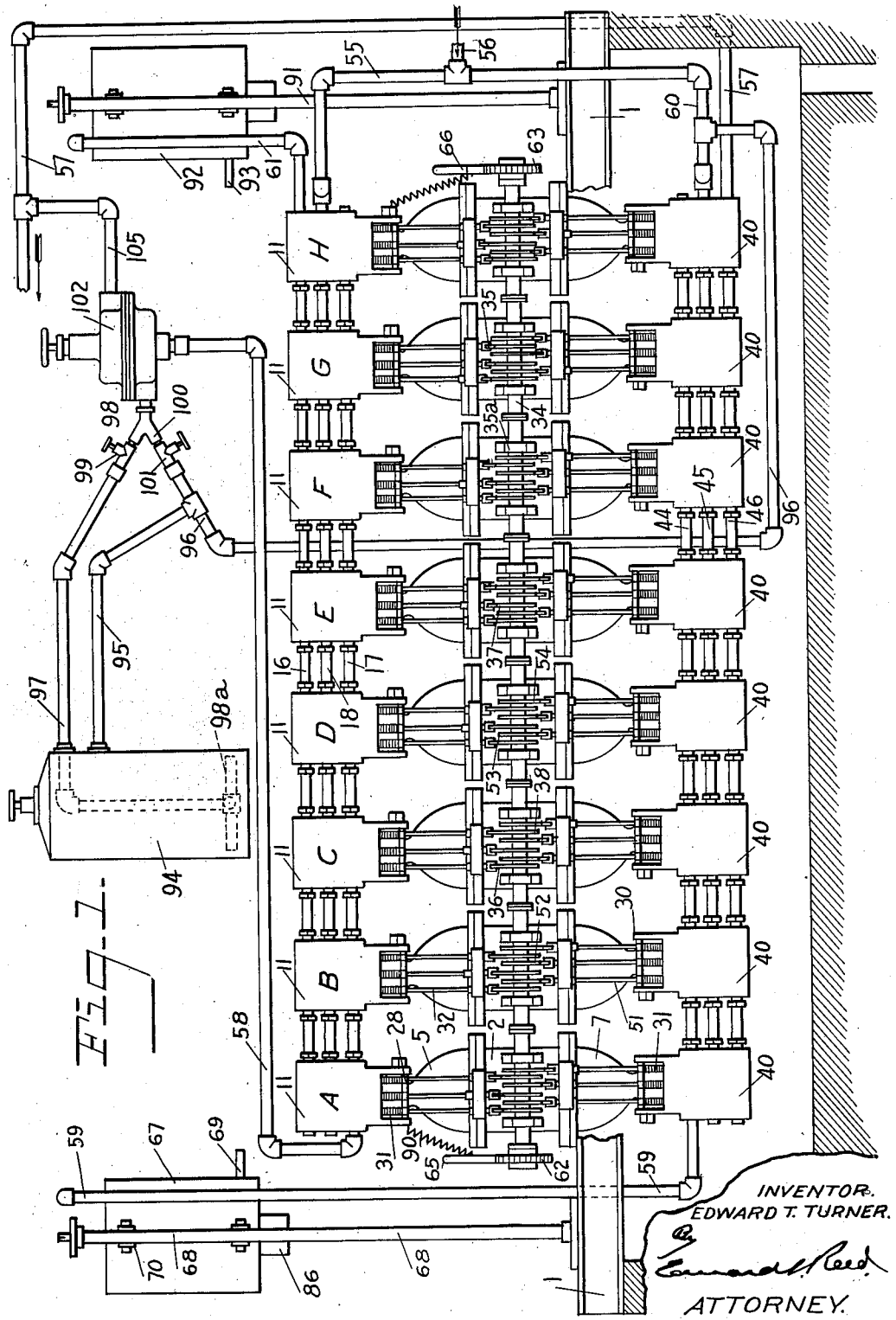

May 20, 1930. E. T. TURNER 1,759,636
WATER SOFTENING APPARATUS
Filed Dec. 22, 1924 4 Sheets-Sheet 1

INVENTOR.
EDWARD T. TURNER.
ATTORNEY.

May 20, 1930. E. T. TURNER 1,759,636
WATER SOFTENING APPARATUS
Filed Dec. 22, 1924 4 Sheets-Sheet 2
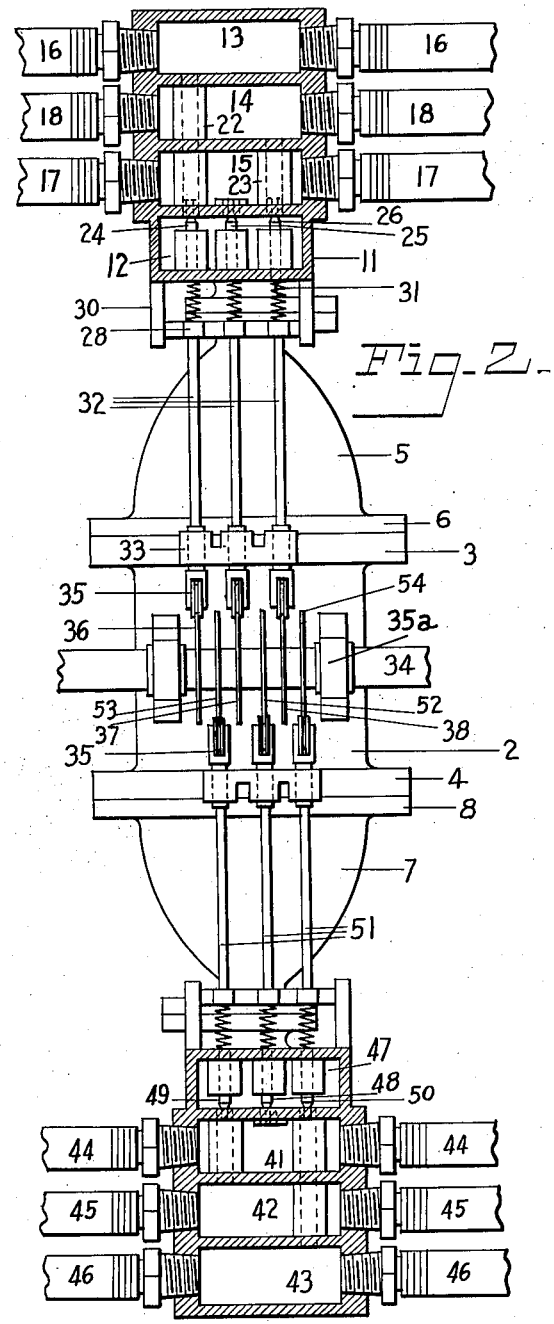
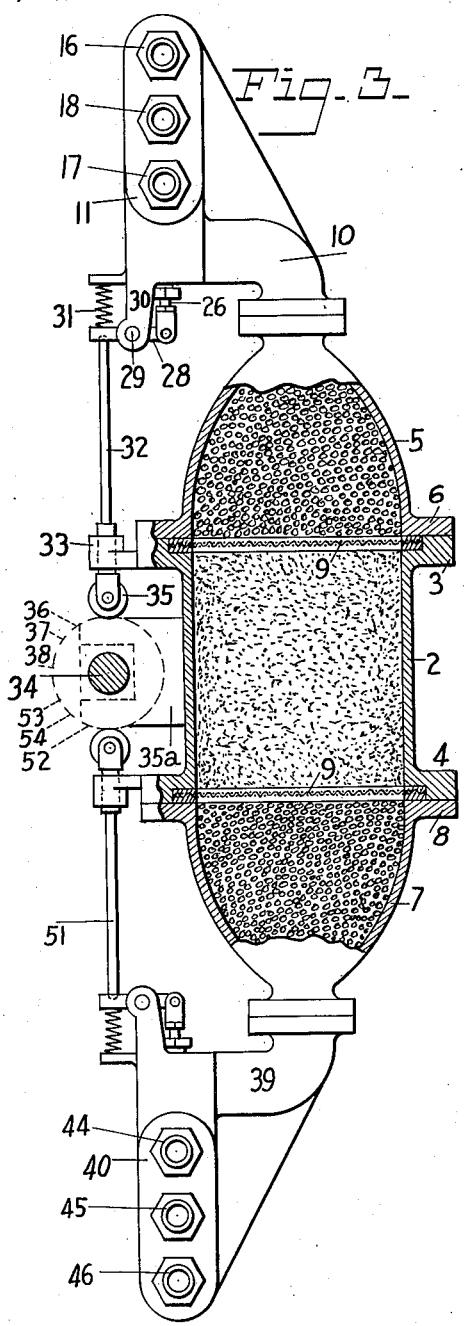
INVENTOR
EDWARD T. TURNER.
ATTORNEY.

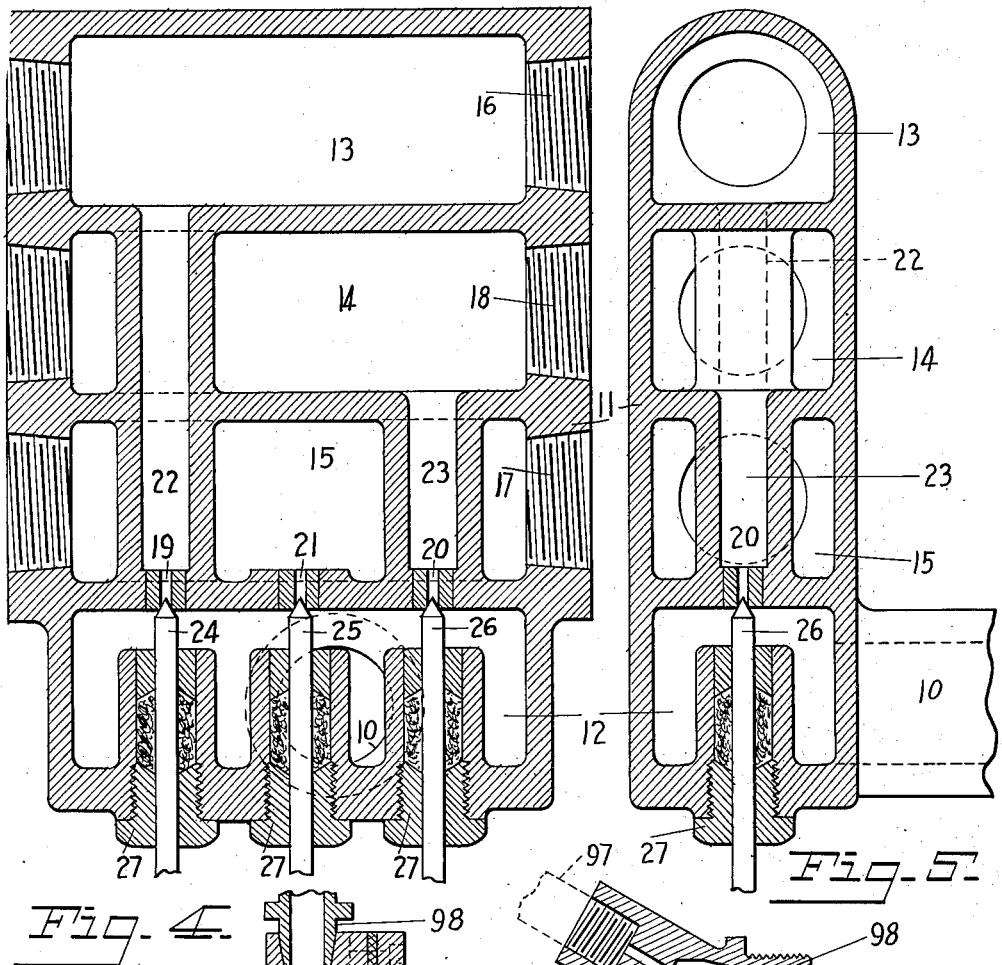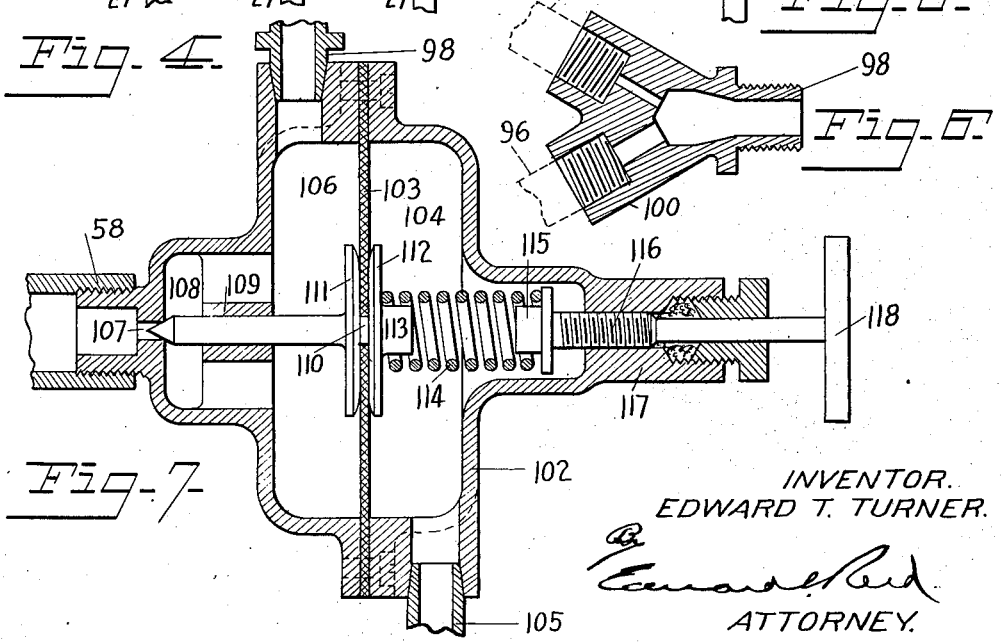

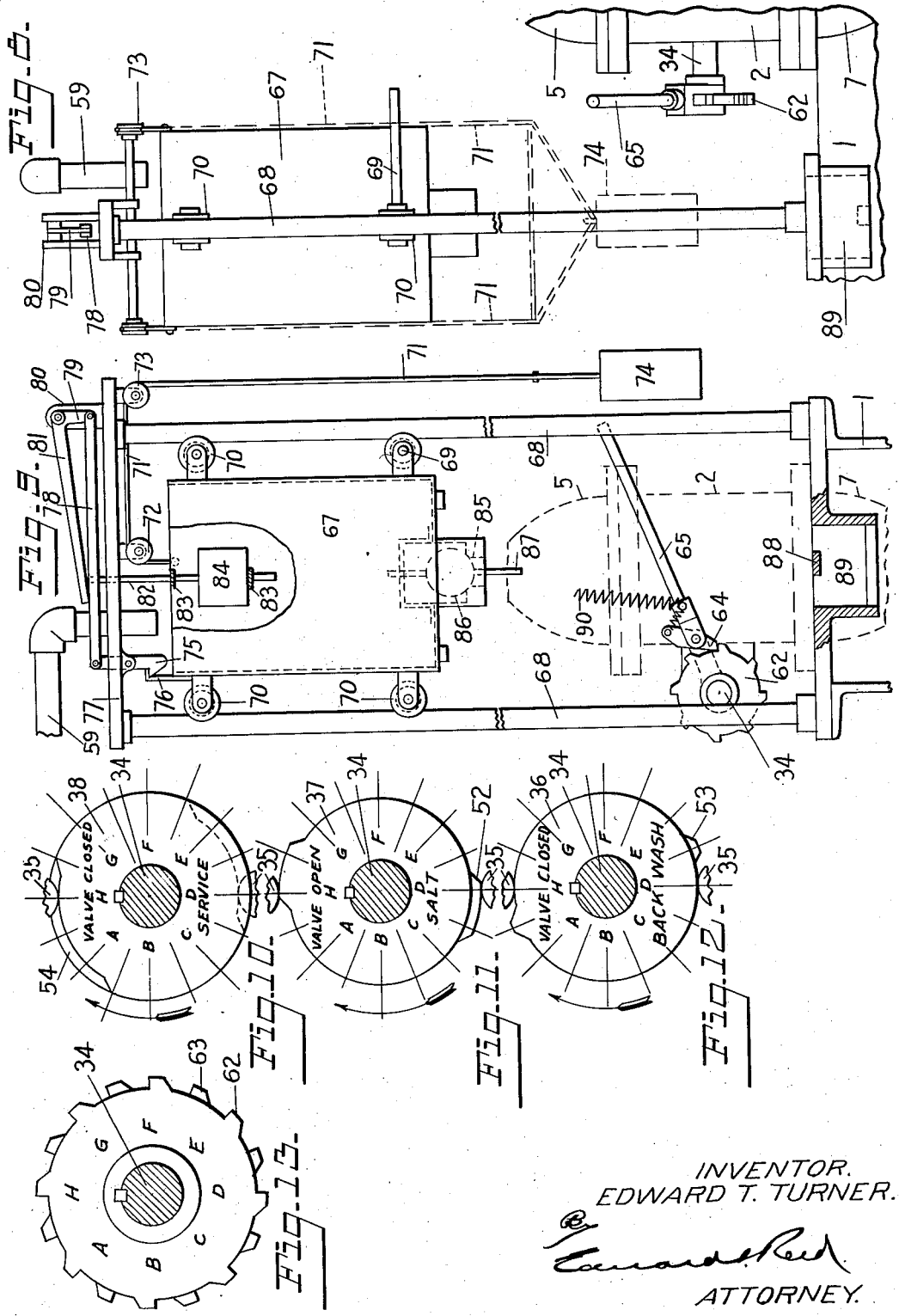

Patented May 20, 1930

1,759,636

UNITED STATES PATENT OFFICE

EDWARD T. TURNER, OF DAYTON, OHIO

WATER-SOFTENING APPARATUS

Application filed December 22, 1924. Serial No. 757,376.

This invention relates to water softening apparatus and more particulary to that type of water softening apparatus which employs as the water softening agent an exchange base material, such as zeolite, glauconite or the like, which will give up its normal base in exchange for the substances which harden the water.

Apparatuses of this character ordinarily comprise a single container for the water softening material, together with means for causing the water to be softened to be passed through this material and then delivered to the service line. When the normal base of the softening material has been given up to such an extent that the material will no longer properly soften the water it is necessary to recondition the material by the subjection of the same to the action of a regenerating solution which will restore to the material its normal base. After the normal base has been restored to the material it is then necessary to rinse out the solution and sediment contained therein and this is accomplished by passing clear water through the container. It will be obvious that the three operations of softening, reconditioning and washing cannot be accomplished simultaneously and as a result the supply of soft water must be interrupted at more or less frequent intervals while the water softening material is restored to a serviceable condition. It has been proposed to provide such an apparatus consisting of two containers and having the fluid connections so arranged and so controlled that one container will operate to soften the water while the material in the other container is being reconditioned. Such an arrangement is open to various objections and, so far as I have been informed, has never been developed to the point where it is commercially practical.

One object of the present invention is to provide a water softening apparatus which will furnish a continuous supply of soft water and which will be automatically controlled to cause parts of the apparatus to be reconditioned while other parts are in service.

A further object of the invention is to provide such a continuous water softening apparatus in which only a relatively small part of the apparatus as a whole will be out of service during the reconditioning operation.

A further object of the invention is to provide an automatic water softening apparatus in which the reconditioning and washing operations will be controlled by the regenerating solution and wash water; and in which the operation of the apparatus as a whole will be controlled by the withdrawal of soft water.

Other objects of the invention will appear as the device is described in detail.

In the accompanying drawings Fig. 1 is an elevation of a continuous water softening apparatus embodying my invention; Fig. 2 is a front elevation of one of the water softening units with the valve casings in section; Fig. 3 is a side elevation of such a unit with the container in section; Fig. 4 is a sectional detail view of one of the valve casings; Fig. 5 is a sectional detail view of one of the valve casings taken at right angles to the section of Fig. 4; Fig. 6 is a sectional detail view of the mixer for the regenerating solution; Fig. 7 is a sectional view of the device for automatically controlling the delivery of regenerating solution to the water softening devices; Fig. 8 is a side elevation of the fluid actuated device for controlling the connections between the various water softening units and the source of supply for the regenerating fluid; Fig. 9 is a front elevation of the same partly broken away; Fig. 10 is a detail view of the cam for actuating the valves which control the supply of hard water; Fig. 11 is a detail view of one of the cams which control the supply of regenerating solution; Fig. 12 is a detail view of one of the cams which control the supply of wash water; and Fig. 13 is a side elevation of the two ratchet wheels by means of which the cams are operated.

In these drawings I have illustrated one embodiment of my invention and have shown the same as comprising a series of water softening units arranged in line and connected in parallel with the inlet and outlet pipes for the water to be softened, the regenerating solution and the wash water, but it will be understood that the number, arrangement and character of the water softening units may be varied from what is here shown and that the controlling devices therefor may take various forms.

In that particular embodiment of the invention here shown the mechanism as a whole comprises eight water softening units which are designated by the letters, A, B, C, D, E, F, G and H, respectively. These several units are supported upon a suitable frame which is here shown as a base 1 consisting of beams spaced apart to receive the lower portions of the several containers and upon which these containers are mounted. The several water softening units are identical in construction and the description of one of them will apply to all. It will be understood that these water softening units may take various forms and may be connected with the sources of supply for water to be softened, regenerating solution and wash water in various ways but, as here shown, each unit comprises a container which consists of a cylindrical body portion 2 having at its upper and lower ends flanges 3 and 4. To each end of this central cylindrical portion is secured an end portion or head which is preferably conical or dome shaped in form. The upper head is shown at 5 and is provided with a flange 6 by means of which it may be secured to the flange 3 of the body portion, and the lower head is shown at 7 and is provided with a flange 8 by means of which it may be secured to the flange 4 of the body portion. Arranged at each end of the body portion 2 of the container and separating the same from the hollow heads 5 and 7, are screens or partitions of foraminous material 9. Water softening material, such as zeolite, glauconite or the like, is supported between the foraminous partitions 9 within the cylindrical body portion of the container, the lower partition serving as a support for this material. The hollow heads 5 and 7 are preferably filled with a relatively coarse gravel. The upper head 5 is provided with an inlet with which is connected a conduit 10 which leads to a valve casing 11. This valve casing as a whole comprises a valve chamber 12 and three transverse passageways 13, 14 and 15, which are connected with and form parts of conduits for water to be softened, regenerating solution and wash water. In the present arrangement the outer passageway 13 is connected at each end with a pipe or conduit 16 which constitutes the outlet conduit for the wash water. The innermost passageway 15 is connected at each end with a conduit 17 which constitutes a supply conduit for regenerating solution, and the intermediate passageway 14 is connected at each end with a conduit 18 which constitutes a supply conduit for the water to be softened. The valve chamber 12 is provided with three ports 19, 20 and 21, which communicate respectively with the passageways 13, 14 and 15. In the present instance, the passageways are superimposed one upon the other and the port 19 communicates with the passageway 13 by means of a conduit 22 which extends through the passageways 14 and 15. The port 20 is connected with the passageway 14 by means of a conduit 23 which extends through the passageway 15. The port 21 communicates directly with the passageway 15. Each of these ports is controlled by a separate valve, the valves being here shown as needle valves 24, 25 and 26, the stems of which are slidably mounted in stuffing boxes 27 in the inner wall of the valve chamber 12. The stems of the valves extend beyond the inner wall of the valve chamber and are provided with suitable actuating devices. In the present construction the end of each valve stem is pivotally connected with a lever 28, the three levers being pivotally supported by a shaft 29 mounted in brackets 30 depending from the valve casing 11. Each lever 28 is acted upon by a spring 31 which tends to move the levers in a direction to hold the respective valves on their seats and thus interrupt the connections between the container and the several passageways of the valve casing. Operatively connected with each lever and adapted to move the same against the tension of the spring 31 is a valve actuating member here shown as a rod 32, which is slidably mounted in a guideway or bearing 33 and the upper end of which is connected with and bears against the underside of the lever 28. Each of these valve actuating members is controlled by a cam mounted on the shaft 34, there being a separate cam for each valve actuating member and each of these members being preferably provided with a roller 35 which contacts with the cam and serves to minimize the friction between these parts. The shaft 34 is journaled in bearings 35ª carried by the body portion 2 of the container and the cams are mounted on this shaft between the two bearings. In the present arrangement the cam for the valve 24 is shown at 36, the cam for the valve 25 at 37 and the cam for the valve 26 at 38, the cams being preferably of the type shown in Figs. 10, 11 and 12.

The lower head 7 of the container for the water softening material is connected by means of a conduit 39 to a valve casing 40 which is similar in its construction to the valve casing 11 and is provided with three transverse passageways 41, 42 and 43, which are interposed respectively in an outlet conduit 44 for the regenerating solution, an inlet conduit 45 for the wash water, and an outlet conduit 46 for the soft water. These passageways are connected with a valve chamber 47 by separate ports which are controlled respectively by valves 48, 49 and 50. These valves are operated in the same manner as the valves above described and the operating rods 51 are actuated by cams mounted on the shaft 34, these cams being, in the present instance, arranged alternately with the cams 36, 37 and 38. The controlling cam for the valve 48 is shown at 52, the cam for the valve 49 at 53, and the cam for the valve 50 at 54. These cams are preferably identical in construction with the corresponding cams for the other set of valves and are mounted on the shaft 34 in positions diametrically opposed to the positions of the first set of cams so that the corresponding valves in the two valve casings will be simultaneously actuated as the cam shaft rotates.

The supply conduit 18 for hard water is connected at one end by means of a pipe 55 with a main supply pipe 56 which leads to the city water mains, or other source of supply for hard water. The other end of the conduit 18 is closed so that the water escaping from that conduit must pass through one or more containers. This water after passing through the containers is delivered to the passageway 43 and the conduit 46 and this conduit is connected at one end with a distribution or service pipe 57 which leads to the faucets or other outlets. The other end of this conduit 46 is closed so that the water can escape from the containers only through the service pipe 57. The supply pipe 17 for regenerating solution is closed at one end and connected at the other end with a pipe 58 which communicates with a source of supply for regenerating solution, as will be hereinafter described. The outlet conduit 44 for the salt solution is closed at one end and is connected at its other end with a discharge pipe 59. The inlet pipe 45 for wash water is closed at one end and is connected by means of a pipe 60 with the main supply pipe 56, and the outlet pipe 16 for the wash water is closed at one end and is connected at its other end with a discharge pipe 61.

The several valve controlling cams of each water softening unit are so arranged with relation one to the other that upon a complete rotation of the shaft each valve will be operated once. The cams for controlling the inlet and outlet valves for the water to be softened are such that these valves will be retained open during the greater part of the rotation of the shaft, preferably through three-quarters of that rotation. The cams for controlling the inlet and outlet for the regenerating solution are of such a character that these valves will be held open during one-eighth of the rotation of the shaft, after the water inlet and outlet valves have been closed, and the cams for controlling the inlet and outlet for wash water are such that these valves will be held open for approximately one-eighth of the rotation of the shaft after the regenerating solution valves have been closed. The cam shaft 34 does not rotate continuously but is operated intermittently, this rotation being in the present instance, controlled by the regenerating solution and wash water which are passed through the several water softening units. Means controlled by the regenerating solution which has been discharged from the water softening unit which is being reconditioned, are utilized for actuating the cam shaft to close the regenerating solution valves in the unit which is being reconditioned and to open the regenerating solution valves in the next succeeding unit and to close the hard and soft water valves in said next unit. At the same time the same movement causes the wash water valves of the first mentioned unit to be opened so that the washing will begin immediately upon the discontinuance of the regeneration. The wash water which passes through said first mentioned unit operates an apparatus which causes a further movement of the shaft to close the wash water valves and open the valves for water to be softened in said unit so that the same is again placed in service. Various devices and arrangements of mechanism may be utilized to accomplish these results but, in the present instance, I have provided the cam shaft 34, at each end, with a ratchet wheel, as shown at 62 and 63. An operating pawl 64 is mounted on a pawl carrier or arm 65 which is pivotally mounted on the axis of the shaft 34 adjacent to ratchet wheel 62, as shown in Figs. 1, 8 and 9. A similar pawl is mounted on a pawl carrier or arm 66 which is mounted on the shaft 34 adjacent to the ratchet wheel 63. Mounted on the main frame or base 1 of the apparatus adjacent to the ratchet wheel 62 is a fluid operated device the movement of which is controlled by the regenerating solution discharged from the water softening unit which is undergoing regeneration. This device is of such a character that when sufficient solution has been passed through the unit to properly regenerate the water softening material it will operate the ratchet wheel 62 and thereby rotate the cam shaft to cause the regenerating solution valves to be closed and the other valves shifted as above explained. In the present installation this actuating device comprises a receptacle 67 which is slidably mounted on upright standards 68 and is so arranged that when it is in its elevated position it will receive the regenerating solution from the discharge pipe 59. When a predetermined quantity of solution is entered in the receptacle 67 it moves downwardly and a part, such as a pin 69 carried by the receptacle, engages the pawl carrier or arm 65 and moves the same a distance sufficient to advance the cam shaft 34 through one-sixteenth of a revolution. In the present arrangement the receptacle is arranged between the two standards 68 and is provided with guide rollers 70 which engage said standards. Cables 71 are connected with the receptacle 67, extend over guides 72 and 73 and have connected to their lower ends a counterweight 74. This counterweight is greater in weight than the empty receptacle but of a weight considerably less than the combined weight of the receptacle and its contents. Consequently when the receptacle is empty the counterweight will move the same to its uppermost position. The receptacle is retained in its uppermost position by means of a latch 75 which engages an ear or keeper 76 on the receptacle and supports the receptacle as the latter fills with liquid until the latch is positively actuated to release the receptacle. As here shown the latch is pivotally mounted on a cross bar 77 which connects the upper ends of the two standards 68 and the upper end of the latch arm is connected by a link 78 with one arm, 79, of a bell crank lever which is pivotally mounted on a bracket 80 carried by the cross bar 77. The other arm 81 of said bell crank lever extends toward the latch and is arranged in the path of a rod 82 which is slidably mounted in guides 83 arranged within the receptacle 67 and to which is rigidly secured a float 84. This float is so arranged that when the receptacle is filled with liquid to the desired level the float will be raised, thereby forcing the rod 82 upwardly against the long arm of the bell crank lever and actuating the latch 75 to release the receptacle which will move downwardly by gravity and actuate the pawl and ratchet mechanism. The receptacle is provided at its bottom with a discharge opening 85 which is normally closed by a valve 86 having a stem 87 projecting downwardly therefrom and arranged to engage a fixed part of the supporting structure to open the valve 86 and permit the discharge of the liquid therefrom. As here shown, the stem engages a cross bar 88 which extends across the discharge opening 89 in the base 1. As soon as the liquid has been discharged from the receptacle the latter will be elevated by the action of the counterweight 74 and the pawl carrying arm 65 will be elevated by a spring 90. It will be noted that the ratchet wheel, although provided with eight teeth, has been moved through but one-sixteenth of a revolution and consequently the pawl 64 will not engage the next succeeding tooth of the ratchet wheel until the latter has been advanced through other means. The ratchet wheel 63 is actuated by a device controlled by the discharged wash water and this device is substantially identical with the device which is actuated by the regenerating solution, consisting of guide standards 91, a receptacle 92 slidably mounted on said standards and having a projection or pin 93 to engage the pawl carrier or arm 66. The receptacle 92 is so arranged that when in its elevated position it will receive the wash water which is discharged from the pipe 61 and when a predetermined quantity of this wash water has entered the receptacle the receptacle will be released in the manner above described and will actuate the pawl carrying arm 66 and cause the pawl to impart one-sixteenth of a revolution to the cam shaft and to both ratchet wheels thereon. The ratchet wheel 63 is also an eight toothed ratchet wheel and is only moved one-sixteenth of a revolution by its own pawl. The two ratchet wheels are mounted with their teeth in staggered relation, as shown in Fig. 13, and the ratchet wheels and cam shaft will be moved through one-eighth of a revolution by the operations of both the regenerating solution controlled trip mechanism and the wash water controlled trip mechanism. The flow of wash water is somewhat more rapid than the flow of regenerating solution, and consequently this trip device will operate ahead of the other, but the operation of the wash water controlled trip device only closes the wash water valve and opens the hard water valve of the particular unit which is being washed out, and the wash water valve of the next unit, which is being reconditioned, is not opened until the other trip device actuates the cam shaft to close the valves for the regenerating solution and open the wash water valves, and at the same time to close the hard water valves and to open the regenerating solution valves of the next or third unit. Thus it will be seen that the operation is continuous and that the several water softening units are successively reconditioned and rinsed out, the operation being wholly automatic in its character and the arrangement being such that the greater part of the apparatus as a whole is in service and producing soft water at all times. In the present instance, six out of the eight units are always functioning as water softening devices. One of the other two is being subjected to the action of the regenerating solution, while the other one is being subjected to the action of the wash water.

Inasmuch as the water to be softened passes from the main supply pipe 56 through the conduit 18, the water softening units, outlet pipe 46 and service line 57, to the point of distribution or outlet, it will be obvious that water will flow from the main supply pipe through the several units only when the service line is open. If the outlet, or faucet, is closed there will be no flow of water through the water softening devices but as soon as this faucet is open the flow will be resumed. It will be noted that in the operation of the valves which control the admission and exhaust of regenerating solution to the several units the inlet valve for regenerating solution of some one of the units is always open because the cams are so arranged as to open the regenerating solution valve of the next succeeding unit when the regenerating solution valve of the preceding unit is closed. Therefore, I have provided means controlled by the flow of soft water through the service line to control the flow of regenerating solution to the delivery pipe 58. In the present apparatus a salt solution is used for regenerating the water softening materials and I have provided a tank or salt container 94 adapted to contain a quantity of salt and connected near its top with a water pipe 95 which in turn is connected with a pipe 96 which leads to the supply pipe 60 for wash water and is thus connected with the main supply pipe for hard water. The tank is also provided with a discharge pipe 97 which, in the present instance, also enters the tank at the top but which extends to a point near the bottom of the tank where it is provided with a series of radial gathering arms 98ª through which the salt water is admitted to the outlet pipe 97. It will be apparent that water is admitted to the top of the salt tank at substantially city pressure and is forced through the bed of salt, so that it becomes thoroughly saturated with the salt, and thence out through the delivery pipe 97. This delivery pipe 97 for the salt solution is connected with a mixer 98 which is in the form of a Y-shaped coupling having a relatively large interior chamber which serves as a mixing chamber. A valve 99 enables the flow of solution to the pipe 97 to the mixer to be regulated. The water supply pipe 96 is connected with the other branch 100 of the mixer and the flow of water to the mixer is controlled by a valve 101. The flow of water and salt solution to the mixer may be regulated by adjusting the valves 99 and 101 to provide a solution of the strength which it is desired to deliver to the water softening devices. The flow of the regenerating solution from the mixer 98 to the water softening units is controlled by the flow of soft water and when the soft water is not flowing the supply of regenerating solution will be cut off, but when the outlet of the service pipe is opened and the soft water begins to flow the supply of regenerating solution will be resumed and will be regulated according to the flow of soft water, increasing and decreasing proportionately to that flow. In the present apparatus I have provided a controlling device for the salt solution which is in the form of a casing 102 divided by a flexible partition or diaphragm 103 into two chambers, one of which, 104, is connected by a pipe 105 with the service pipe 57. The other of these chambers, 106, is connected with the mixer 96 which discharges directly into that chamber. This chamber 106 is also connected with the delivery pipe 58 which conveys the salt solution to the conduit 17 of the softening apparatus. The communication between the chamber 106 of the controlling device and the pipe 58 is valve controlled and, as here shown, the communication is established through a relatively small port 107 which is controlled by a needle valve 108 slidably mounted in a guideway 109 and connected with the diaphragm 103. As here shown, the stem 110 of the valve extends through the diaphragm and has rigidly secured thereto, on that side of the diaphragm adajcent to the valve, a disk 111. A second disk 112 is arranged on the other side of the diaphragm and, in the present instance, is provided with a hub portion 113 which may be screwed onto the stem 110 of the valve to cause the diaphragm to be firmly clamped between the two disks. If desired, the edges of the disk may be beveled to facilitate the flexing of the diaphragm and to prevent injury to the diaphragm due to sharp corners. A spring 114 is confined between the disk 112 and the wall of the chamber 104 and tends to hold the valve 108 normally in its closed position. As here shown, this spring 114 is in the form of a coiled spring, one end of which is supported on the hub 113 and the other end of which is supported by a head 115 mounted on a screw threaded rod 116 which is threaded into a boss 117 forming part of the casing 102 and is provided on its outer end with a hand wheel 118 by means of which it may be rotated to regulate the tension of the spring 114.

It will be apparent that when the outlet for the service pipe 57 is closed the pressure in the chamber 104 on the diaphragm 103 will be substantially equal to the pressure in the service pipe and will be approximately equal to the pressure in the chamber 106 which is connected with the main supply pipe. There will be a slight differential in this pressure but this will be overcome by the spring 114 which tends to move the valve normally toward its seat and will hold the same closed so long as the service outlet is closed. When the service outlet is open the pressure in the chamber 104 of the controlling device will immediately drop and the pressure in the chamber 106 thereof will force the diaphragm toward the chamber 104, thus moving the valve 108 to its open position and permitting the salt solution to be discharged to the pipe 58. The amount of movement imparted to the diaphragm by the pressure in the chamber 106 and consequently the amount of salt solution that can escape through the port 107 will depend upon the pressure which is retained in the chamber 104. If the service outlet is only slightly open sufficient pressure will be retained in chamber 104 to prevent the full opening of the valve but if the service outlet is fully open there will be practically no pressure in the chamber 109 and the valve will open to its full extent. It will be apparent, therefore, that as soon as the service outlet is opened regenerating solution will begin to flow through that particular unit which is in communication with the conduit 17 and that this flow will continue so long as the water to be softened continues to flow through the apparatus.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a water softening mechanism, a series of water softening devices of relatively small capacity, means for connecting each of said water softening devices with a source of supply of water to be softened and with a source of supply of regenerating solution, and mechanically operated means for so controlling said connecting means that while one of said water softening devices is connected with the source of supply of regenerating solution, a plurality of said water softening devices will be connected with a source of supply of water to be softened.

2. In a water softening mechanism, a series of water softening devices of relatively small capacity, means for connecting each of said water softening devices with a source of supply of water to be softened and with a source of supply of regenerating solution, and with a source of supply of wash water, and mechanically operated means for so controlling said connecting means that while one of said water softening devices is connected with the source of supply of regenerating solution, another of said water softening devices will be connected with the source of supply of wash water, and a plurality of said water softening devices will be connected with the source of supply of water to be softened.

3. In a water softening mechanism, a series of water softening devices, a conduit for hard water connected with each of said water softening devices, a conduit for regenerating solution connected with each of said water softening devices, valves to control the connections between said water softening devices and said conduits, and fluid controlled means for actuating said valves to cause the several water softening devices to be successively connected with said conduit for regenerating solution and to cause a plurality of said water softening devices to be connected with said conduit for hard water while another of said water softening devices is connected with the conduit for regenerating solution.

4. In a water softening mechanism, a series of water softening devices, a conduit for hard water connected with each of said water softening devices, a conduit for regenerating solution connected with each of said water softening devices, a conduit for wash water connected with each of said water softening devices, valves to control the connections between said water softening devices and the respective conduits, and fluid controlled means for actuating said valves to cause the several water softening devices to be successively connected with said conduit for wash water and to cause a plurality of said water softening devices to be connected with conduit for hard water while one of said water softening devices is connected with the conduit for regenerating solution and another is connected with the conduit for wash water.

5. In a water softening mechanism, a series of water softening devices each comprising an inlet for water to be softened and an inlet for regenerating solution, separate valves to control the respective inlets, an actuating device common to the valves of the several water softening devices and comprising means to operate said valves in such relation one to another that the inlets for water to be softened of a plurality of said water softening devices will be open while the inlet for regenerating solution of another of said water softening devices is open.

6. In a water softening mechanism, a series of water softening devices, each having an inlet for water to be softened, an inlet for regenerating solution and an inlet for wash water, separate valves to control the respective inlets, an actuating device common to the valves of all of said water softening devices, said actuating device having means for opening a single inlet only of each of said water softening devices and for actuating said valves in such relation one to the other that the inlet for water to be softened of a plurality of said water softening devices will be open while the inlet for regenerating solution of another of said water softening devices is open and the inlet for wash water of still another water softening device is open.

7. In a water softening mechanism, a series of water softening devices each comprising an inlet for water to be softened, an inlet for regenerating solution and an inlet for wash water, separate valves for controlling the respective inlets, valve actuating means for the several water softening devices arranged to so control said valves that the inlets for water to be softened of a plurality of said water softening devices will be simultaneously open while the inlet for regenerating solution of another of said water softening devices is open and the inlet for wash water of still another of said water softening devices is open and to cause the inlets for regenerating solution for the several water softening devices to be successively opened.

8. In a water softening mechanism, a supply conduit for hard water, a discharge conduit for soft water, a supply conduit for regenerating solution, a discharge conduit for regenerating solution, a series of water softening devices each connected with all of said conduits, and means for so controlling said connections that the several water softening devices will be successively connected with the supply and discharge conduits for regenerating solution and that while one of said water softening devices is connected with said supply and discharge conduits for said regenerating solution a plurality of said water softening devices will be connected with the supply conduit for hard water and the discharge conduit for soft water.

9. In a water softening mechanism, a supply conduit for hard water, a discharge conduit for soft water, a supply conduit for regenerating solution, a discharge conduit for regenerating solution, a supply conduit and a discharge conduit for wash water, a series of water softening devices each connected with all of said conduits, and mechanically operated means for controlling said connections to cause the several water softening devices to be successively connected with the supply conduit for hard water and the discharge conduit for soft water, the supply and discharge conduits for regenerating solution and the supply and discharge conduits for the wash water.

10. In a water softening mechanism, a supply conduit for hard water, a discharge conduit for soft water, a supply conduit for regenerating solution, a discharge conduit for regenerating solution, a supply conduit and a discharge conduit for wash water, a series of water softening devices each connected with all of said conduits, and means for controlling said connections to cause the several water softening devices to be successively connected with the supply conduit for hard water and the discharge conduit for soft water, the supply and discharge conduits for regenerating solution and the supply and discharge conduits for the wash water, and to cause a plurality of said water softening devices to be connected with the supply conduit for hard water and the discharge conduit for soft water while two other water softening devices are connected respectively with the supply and discharge conduits for regenerating solution and the supply and discharge conduits for wash water.

11. In a water softening mechanism, a supply conduit for hard water, a discharge conduit for soft water, a supply conduit for regenerating solution, a discharge conduit for regenerating solution, a supply conduit and a discharge conduit for wash water, a series of water softening devices each of which is connected with all of said conduits, valves for controlling said connections with the respective water softening devices, and a mechanically operated valve actuating device common to all of said valves and having means for actuating said valves in timed relation one to the other.

12. In a water softening mechanism, a supply conduit for hard water, a discharge conduit for soft water, a supply conduit for regenerating solution, a discharge conduit for regenerating solution, a supply conduit and a discharge conduit for wash water, a series of water softening devices each of which is connected with all of said conduits, valves for controlling said connections, cams for controlling the respective valves, and means for simultaneously actuating all of said cams.

13. In a water softening mechanism, a supply conduit for hard water, a discharge conduit for soft water, a supply conduit for regenerating solution, a discharge conduit for regenerating solution, a series of water softening devices each of which is connected with all of said conduits, valves for controlling said connections, cams for controlling the respective valves, and means for simultaneously actuating all of said cams, said cams being so shaped that each of said water softening devices will be connected with the supply conduit for hard water and the discharge conduit for soft water for a relatively long period and will then be connected with the supply and discharge conduits for regenerating solution for a relatively short period.

14. In a water softening mechanism, a supply conduit for hard water, a discharge conduit for soft water, a supply conduit for regenerating solution, a discharge conduit for regenerating solution, a supply conduit and a discharge conduit for wash water, a series of water softening devices each connected with all of said conduits, valves to control said connections, cams to control the several valves, and means for simultaneously actuating all of said cams, said cams being so shaped that each water softening device will be connected for a relatively long period with the supply conduit for hard water and the discharge conduit for soft water will then be connected for a relatively short period with the supply and discharge conduits for regenerating solution and will then be connected for a further relatively short period with the supply and discharge conduits for wash water.

15. In a water softening mechanism, a supply conduit for hard water, a discharge conduit for soft water, a supply conduit for regenerating solution, a discharge conduit for regenerating solution, a supply conduit and a discharge conduit for wash water, a series of water softening devices each connected with all of said conduits, separate valves to control said connections, a cam shaft arranged adjacent to the several water softening devices, valve actuating cams secured to said shaft and adapted to actuate the respective valves, and means for actuating said shaft.

16. In a water softening mechanism, a series of water softening devices each comprising an inlet and an outlet for water to be softened, an inlet and an outlet for regenerating solution, and an inlet and outlet for wash water, separate valves to control the respective inlets and outlets, and a single actuating device having means to control the several valves.

17. In a water softening mechanism, a water softening device comprising an inlet and an outlet for water to be softened, an inlet and an outlet for regenerating solution, and an inlet and an outlet for wash water, separate valves to control the respective inlets and outlets, a shaft mounted adjacent to said water softening device, and a plurality of valve actuating cams carried by said shaft and arranged to act on the respective valves, and means for actuating said shaft.

18. In a water softening mechanism, a series of water softening devices each comprising an inlet and an outlet for water to be softened, an inlet and an outlet for regenerating solution, and an inlet and outlet for wash water, separate valves to control the respective inlets and outlets, a shaft rotatably mounted adjacent to the several water softening devices, a plurality of cams mounted on said shaft adjacent to each water softening device and arranged to control the several valves of the respective water softening devices, and means for actuating said shaft.

19. In a water softening mechanism, a series of water softening devices each having an inlet for hard water and an outlet for soft water, an inlet and an outlet for regenerating solution and an inlet and outlet for wash water, the inlets and outlets being arranged respectively at opposite ends of said water softening devices, valves to control the respective inlets and outlets, a shaft extending transversely to said water softening devices between the ends thereof, means actuated by said shaft for controlling the positions of said valves, and means for operating said shaft.

20. In a water softening mechanism, a series of water softening devices each having an inlet for hard water and an outlet for soft water, an inlet and an outlet for regenerating solution and an inlet and outlet for wash water, the inlets and outlets being arranged respectively at opposite ends of said water softening devices, valves to control the respective inlets and outlets, a shaft extending transversely to the several water softening devices between the ends thereof, a series of cams mounted on said shaft adjacent to each of said water softening devices, means for connecting each of said cams with one of said valves, and means for rotating said shaft.

21. In a water softening mechanism, a water softening device, a conduit for hard water connected therewith, a conduit for regenerating solution connected with said water softening device, valves to control the connections between said water softening device and said conduits, and means controlled by the flow of regenerating solution for actuating said valves.

22. In a water softening mechanism, a series of water softening devices, a conduit for hard water connected with each of said water softening devices, a conduit for regenerating solution connected with each of said water softening devices, a conduit for wash water connected with each of said softening devices, valves to control the connections between said water softening devices and the respective conduits, and means controlled by the regenerating solution and said wash water to actuate said valves.

23. In a water softening mechanism, a water softening device, a conduit for hard water connected therewith, a conduit for regenerating solution connected with said water softening device, a conduit for wash water connected with said water softening device, valves to control the connections between said water softening device and the respective conduits, a device to actuate said valves, means controlled by the flow of regenerating solution to cause said valve actuating device to actuate a portion of said valves, and other means controlled by the quantity of wash water discharged from said softening device to cause said valve actuating device to actuate the remainder of said valves.

24. In a water softening mechanism, a water softening device, an inlet conduit and an outlet conduit for water to be softened connected with said water softening device, an inlet conduit and an outlet conduit for regenerating solution connected with said water softening device, valves to control the connections between said water softening device and the respective conduits, means for actuating said valves, and means controlled by the regenerating solution discharged from said outlet for regenerating solution to control the operation of said valve actuating means.

25. In a water softening mechanism, a series of water softening devices each having an inlet and an outlet for water to be softened and an inlet and an outlet for regenerating solution, valves to control said inlets and said outlets, means for actuating said valves, and means controlled by the regenerating solution discharged from the outlet for regenerating solution of one of said water softening devices to cause said valve actuating means to actuate the valves for another of said water softening devices.

26. In a water softening mechanism, a series of water softenng devices each having an inlet and an outlet for water to be softened, and an inlet and outlet for regenerating solution, valves to control said inlets and said outlets, and means controlled by the regenerating solution discharged from one of said water softening devices to close the valves for the inlet and outlet for regenerating solution of that water softening device and to open the valves for the inlet and outlet for regenerating solution of another of said water softening devices and to close the inlet and outlet for water to be softened of the last mentioned water softening device.

27. In a water softening mechanism, a series of water softening devices each having an inlet and an outlet for water to be softened, an inlet and an outlet for regenerating solution and an inlet and outlet for wash water, valves to control the respective inlets and outlets, means controlled by the regenerating solution discharged from one of said water softening devices to close the inlet and the outlet for regenerating solution of that water softening device, to open the valves for the inlet and outlet for regenerating solution of another of said water softening devices and to close the inlet and the outlet for water to be softened of the last mentioned water softening device, and means controlled by the wash water discharged from another of said water softening devices to close the valves for the inlet and outlet for wash water in the last mentioned water softening device and to open the valves for the inlet and outlet for water to be softened of the last mentioned water softening device, and to open the valves for the inlet and outlet for wash water of the first mentioned water softening device.

28. In a water softening mechanism, a series of water softening devices each having an inlet and an outlet for water to be softened, an inlet and an outlet for regenerating solution, and an inlet and outlet for wash water, valves to control the respective inlets and outlets, a valve actuating device having means for actuating the valves of all of said water softening devices, means controlled by the regenerating solution discharged from said water softening devices to cause said valve actuating device to actuate a part of said valves, and means controlled by the wash water discharged from said water softening devices to cause said valve actuating device to actuate another part of said valves.

29. In a water softening mechanism, a series of water softening devices each having an inlet and an outlet for water to be softened, an inlet and an outlet for regenerating solution and an inlet and outlet for wash water, valves to control the respective inlets and outlets, a valve actuating device having step by step movement and having means for actuating the valves of all of said water softening devices in timed relation one to the other, means controlled by the regenerating solution discharged from said water softening devices for advancing said valve actuating device one step, and means controlled by the wash water discharged from said water softening devices for advancing said valve actuating device another step.

30. In a water softening mechanism, a series of water softening devices each having an inlet and an outlet for water to be softened, an inlet and an outlet for regenerating solution and an inlet and outlet for wash water, valves to control the respective inlets and outlets, a rotatable valve actuating device having step by step movement and having means for actuating the valves of all of said water softening devices in timed relation one to the other, ratchet wheels secured to said valve actuating device, said ratchet wheels having an equal number of teeth and being so arranged that the teeth of one ratchet wheel will lie in radial planes extending between corresponding teeth of the other ratchet wheel, a pawl carrier mounted adjacent to each ratchet wheel, pawls carried by said pawl carrier to engage said ratchet wheels, a fluid operated device controlled by the regenerating solution discharged from said water softening devices to actuate one of said pawl carriers, and a second fluid operated device controlled by the wash water discharged from said water softening devices to actuate the other of said pawl carriers.

31. In a water softening mechanism, a series of water softening devices each having an inlet and an outlet for water to be softened, an inlet and an outlet for regenerating solution and an inlet and outlet for wash water, valves to control the respective inlets and outlets, a rotatable valve actuating device having step by step movement and having means for actuating the valves of all of said water softening devices in timed relation one to the other, ratchet wheels secured to said valve actuating device, said ratchet wheels having an equal number of teeth and the teeth of each ratchet wheel being spaced apart distances substantially equal to two steps of movement of said actuating device, a pawl carrier mounted adjacent to each ratchet wheel, pawls carried by said pawl carriers to engage said ratchet wheels, a fluid operated device controlled by the regenerating solution discharged from said water softening devices to actuate one of said pawl carriers, and a second fluid operated device controlled by the wash water discharged from said water softening devices to actuate the other of said pawl carriers, the movement of each pawl carrier being such that the corresponding ratchet wheel will be advanced a distance less than the space between two adjacent teeth thereof.

32. In a water softening mechanism, a water softening device, an inlet conduit and an outlet conduit for water to be softened connected with said water softening device, an inlet conduit and an outlet conduit for regenerating solution connected with said water softening device, an inlet conduit and an outlet conduit for wash water connected with said water softening device, valves to control the connections between said water softening device and the respective conduits, a device for actuating said valves having step by step movement, the successive steps of said movement serving to actuate different valves, a fluid operated device controlled by the regenerating solution discharged from said outlet conduit for the regenerating solution to advance said valve actuating device one step, and a fluid operated device controlled by the wash water discharged from said wash water outlet conduit to advance said valve acuating device another step.

33. In a water softening mechanism, a water softening device, an inlet conduit and an outlet conduit for water to be softened connected with said water softening device, an inlet conduit and an outlet conduit for regenerating solution connected with said water softening device, valves to control the connections between said water softening device and the respective conduits, a device for actuating said valves, an actuating member connected with said valve actuating device, a fluid receptacle mounted for vertical movement and arranged to receive the regenerating solution discharged from said outlet conduit for regenerating solution, means for moving said receptacle to and retaining the same in an elevated position, and means controlled by the fluid entering said receptacle to release the same and permit it to move downwradly, said receptacle having a part arranged to engage the actuating member of said valve actuating device and impart operative movement to said valve actuating device.

34. In a water softening mechanism, a water softening device, an inlet conduit and an outlet conduit for water to be softened connected with said water softening device, an inlet conduit and an outlet conduit for regenerating solution connected with said water softening device, valves to control the connections between said water softening device and the respective conduits, a device for actuating said valves, an actuating member connected with said valve actuating device, a fluid receptacle mounted for vertical movement and arranged to receive the regenerating solution discharged from said outlet conduit for regenerating solution, a detent to retain said receptacle in an elevated position, a float mounted in said receptacle, means actuated by said float to move said detent into an inoperative position when a predetermined quantity of fluid has entered said receptacle and thereby release said receptacle for downward movement, said receptacle having a part to engage and operate the actuating member for said valve actuating device, and means to return said receptacle to its elevated position.

35. In a water softening mechanism, a plurality of water softening devices each having an inlet and an outlet for water to be softened, and an inlet and an outlet for regenerating solution, valves to control the respective inlets and outlets of each water softening device, a valve actuating device common to the valves of all of said water softening devices, an actuating member connected with said valve actuating device, a fluid receptacle mounted for vertical movement, a conduit leading from the outlets for regenerating solution of the several water softening devices and arranged to discharge into said receptacle, a catch adapted to engage a part of said receptacle and retain the same in its elevated position, a float mounted in said receptacle, means actuated by said float to move said catch into inoperative position when a predetermined quantity of fluid has entered said receptacle, said receptacle having a part to engage and operate the actuating member for said valve actuating device, said receptacle also having a discharge opening, a valve to close said discharge opening, and means to open said valve as said receptacle approaches its lowermost position.

36. In a water softening mechanism, a plurality of water softening devices each having an inlet and an outlet for water to be softened, and an inlet and an outlet for regenerating solution, valves to control the respective inlets and outlets of each water softening device, a valve actuating device common to the valves of all of said water softening devices, an actuating member conected with said valve actuating device, upright guides arranged adjacent to said actuating member, a fluid receptacle movably mounted on said guides and having a part to engage and operate said actuating member as said receptacle moves downwardly, a counterweight connected with said receptacle to move the same to its elevated position when empty, a detent to engage said receptacle and retain the same in its elevated position, and a conduit leading from the outlets for said water softening devices and discharging into said receptacle, a float mounted in said receptacle, means actuated by said float to move said catch into an inoperative position and permit said receptacle to move downwardly, said receptacle having a discharge opening, a valve to close said opening, and means for opening said valve as said receptacle approaches the lower limit of its movement.

37. In a water softening mechanism, a water softening device, an inlet conduit and an outlet conduit for water to be softened connected with said water softening device, an inlet conduit and an outlet conduit for regenerating solution connected with said water softening device, an inlet conduit and an outlet conduit for wash water connected with said water softening device, valves to control the connections between said water softening devices and the respective conduits, a device to actuate said valves, two actuating members connected with said valve actuating device, separate fluid receptacles arranged to receive the fluid discharged from said outlet, conduits for regenerating solution and wash water respectively, each of said receptacles being mounted for vertical movement and having parts arranged to engage and operate the respective actuating members for said actuating device, means to move said receptacles to and retain the same in elevated positions, and means controlled by the fluid entering the respective receptacles to release the same for downward movement by gravity.

38. In a water softening mechanism, a water softening device having an inlet and outlet for water to be softened, an inlet and an outlet for regenerating solution, and an inlet and outlet for wash water, separate valves to control the respective inlets and outlets, a valve actuating device to control the positions of said valves, and fluid operated devices controlled by the fluid discharged from one of said outlets to operate said valve actuating device.

39. In a water softening mechanism, a plurality of water softening devices each having an inlet and an outlet for water to be softened, an inlet and an outlet for regenerating solution and an inlet and an outlet for wash water, separate valves to control the respective inlets and outlets, a valve actuating device to control the positions of said valves, an actuating member for said actuating device, a fluid receptacle mounted for vertical movement, means for moving said receptacle to and retaining the same in an elevated position, a conduit leading from one set of outlets for said water softening devices and discharging into said receptacle, means for releasing said receptacle when a predetermined quantity of fluid has entered the same and permitting the same to move downwardly, and means carried by said receptacle to engage and operate the actuating member for said valve actuating device.

40. In a water softening mechanism, a plurality of water softening devices each having an inlet and an outlet for water to be softened, an inlet and an outlet for regenerating solution and an inlet and an outlet for wash water, separate valves to control the respective inlets and outlets, a valve actuating device to control the positions of said valves, an actuating member for said actuating device, a fluid receptacle mounted for vertical movement, means for moving said receptacle to and retaining the same in an elevated position, a conduit leading from one set of outlets for said water softening devices and discharging into said receptacle, means for releasing said receptacle when a predetermined quantity of fluid has entered the same and permitting the same to move downwardly, means carried by said receptacle to engage and operate the actuating member for said valve actuating device, said receptacle having a discharge opening, a valve to close said opening, and means for opening said valve, after said receptacle has operated said actuating member.

41. In a water softening mechanism, a plurality of water softening devices each having an inlet and an outlet for water to be softened, an inlet and an outlet for regenerating solution and an inlet and an outlet for wash water, separate valves to control the respective inlets and outlets, a valve actuating device common to said valves, two actuating members connected with said valve actuating device and adapted to alternately actuate the same, a vertically movable fluid receptacle mounted adjacent to each actuating member and having means for operating the respective actuating members as said receptacle moves downwardly, means for moving said receptacles into and retaining the same in elevated positions, a conduit leading from the outlets for regenerating solution and discharging into one of said receptacles, a second conduit leading to the outlets for wash water and discharging into the other of said receptacles, floats mounted in said receptacles, means actuated by said floats for releasing said receptacles, and permitting the same to move downwardly, each of said receptacles having a normally closed outlet, and means for opening said outlets as said receptacles approach their lowermost positions.

42. In a water softening mechanism, a water softening unit comprising a container for water softening material, said container having an inlet and an outlet, a valve casing having a plurality of passageways each connected with said inlet, separate valves to control said connections, and means for actuating said valves to cause said container to be connected successively with said passageways.

43. In a water softening mechanism, a water softening unit comprising a container for water softening material, said container having an opening at each end thereof, valve casings connected with the respective openings and each having a plurality of passageways communicating with the respective openings, separate valves to control the communication between said passageways and said openings, and means for actuating said valves to cause said container to be connected successively with the passageways in said valve casings.

44. In a water softening mechanism, a water softening unit comprising a container for water softening material, said container having a conduit at each end thereof, valve casings connected with the respective conduits and each having a plurality of passageways, a separate valve to control the communication between each of said passageways and the corresponding conduit, and means for simultaneously actuating the two valves which control the corresponding passageways in the two valve casings.

45. In a water softening mechanism, a water softening unit comprising a container for water softening material, a valve casing having a conduit leading to said container and comprising a plurality of superimposed passageways, ports connecting the respective passageways with said conduit, separate valves to control the respective ports, and means for actuating said valves.

46. In a water softening mechanism, a water softening unit comprising a container for water softening material, a valve casing having a conduit leading to said container and comprising a plurality of superimposed passageways, ports connecting the respective passageways with said conduit, separate valves to control the respective ports, a valve actuating device mounted on said container for controlling the respective valves, and means for operating said valve actuating device.

47. In a water softening mechanism, a water softening unit comprising a container for water softening material, a valve casing carried by said container and comprising a plurality of passageways connected with said container, separate valves controlling said connections, a lever operatively connected with each of said valves, a spring to move said lever in one direction, an actuating rod to move said lever in the other direction, and a cam for actuating said rod.

48. In a water softening mechanism, a series of water softening devices, a conduit for hard water connected with each of said water softening devices, a conduit for regenerating solution connected with each of said water softening devices, valves to control the respective connections, means to actuate said valves, a source of supply for regenerating solution connected with said regenerating solution conduit, a service pipe for soft water connected with each of said water softening devices, and a device controlled by the flow of soft water through said service pipe to control the connection between said regenerating solution conduit and said source of supply for said regenerating solution.

49. In a water softening mechanism, a series of water softening devices, a conduit for hard water connected with each water softening device, a conduit for regenerating solution connected with each water softening device, valves to control the respective connections, means to actuate said valves, a source of supply for regenerating solution connected with said regenerating solution conduit, a discharge conduit for soft water connected with each water softening device, a valve for controlling the connection between said source of supply for said regenerating solution and said regenerating solution conduit, a fluid pressure device for controlling said valve, and an operative connection between said fluid pressure device and said discharge conduit for soft water.

50. In a water softening mechanism, a series of water softening devices, a conduit for hard water connected with each of said water softening devices, a discharge conduit for soft water connected with said water softening devices, a conduit for regenerating solution connected with each of said water softening devices, valves to control the respective connections, means to actuate said valves, a controlling device comprising a housing, a diaphragm dividing said housing into two chambers, one of said chambers being connected with the discharge conduit for soft water and the other of said chambers being connected with said regenerating solution conduit, a valve to control the last mentioned connection, said valve being controlled by said diaphragm, a source of supply for regenerating solution, a mixer connected with said source of supply and with the source of supply for hard water, and discharging into the last mentioned chamber of said housing, and a spring acting on said diaphragm to hold said valve on its seat.

51. In a water softening mechanism, a series of water softening devices, means for connecting each of said water softening devices with a source of supply of hard water, a source of supply of regenerating solution connected with each of said water softening devices, valves to control the respective connections, means to actuate said valves, and means separate from said valves and controlled by the flow of water through said water softening devices to control the quantity of regenerating solution delivered to said water softening devices.

52. In a water softening mechanism, a series of water softening devices, means for connecting each of said water softening devices with a source of supply of hard water, a source of supply of regenerating solution connected with each of said water softening devices, valves to control the respective connections, means to actuate said valves, a discharge conduit for soft water connected with said water softening devices, a fluid pressure controlled device connected with said source of supply for hard water and said discharge conduit, and means controlled by said device for regulating the flow of regenerating solution to said water softening devices.

53. In a water softening mechanism, a series of water softening devices, means for connecting each of said water softening devices with a source of supply of hard water, a source of supply of regenerating solution connected with each of said water softening devices, valves to control the respective connections, means to actuate said valves, a discharge conduit for soft water, a regulating device comprising a casing, a diaphragm dividing said casing into two chambers, means for connecting one of said chambers with the source of supply for hard water and connecting the other of said chambers with said discharge conduit, a connection between the first mentioned chamber and said source of supply of regenerating solution, and a conduit leading from said first mentioned chamber to said water softening devices, a valve to control the flow of solution from said chamber to said last mentioned conduit, and a spring acting on said diaphragm to hold said valve normally in its closed position.

54. In a water softening mechanism, a series of water softening devices, a conduit for hard water connecting each of said water softening devices with a source of supply for hard water, a conduit for regenerating solution connected with each of said water softening devices, valves to control the respective connections, means to actuate said valves, a discharge conduit for soft water connected with each of said water softening devices, a source of supply for regenerating solution, a controlling device comprising a casing, a diaphragm dividing said casing into two chambers, one of said chambers being connected with said source of supply for regenerating solution and said source of supply for hard water, and also having an outlet leading to said conduit for regenerating solution, a valve to control said outlet, an operative connection between said valve and said diaphragm, a spring acting on said valve to hold the same normally in its closed position, and a connection between the other chamber of said controlling device and said discharge conduit.

55. In a water softening mechanism, a series of water softening devices, a conduit for hard water connecting each of said water softening devices with a source of supply for hard water, a conduit for regenerating solution connected with each of said water softening devices, valves to control the respective connections, means to actuate said valves, a discharge conduit for soft water connected with each of said water softening devices, a source of supply for regenerating solution, a controlling device comprising a housing, a diaphragm dividing the same into two chambers, a mixer communicating with one of said chambers and connected with said source of supply for said regenerating solution and said source of supply for hard water, said chamber also having an outlet communicating with said conduit for regenerating solution, a valve to control said conduit, an operative connection between said valve and said diaphragm, a spring acting on said valve to hold the same normally in its closed position, and a connection between the other chamber of said controlling device and said discharge conduit.

56. In a water softening mechanism, a series of water softening devices, each having an inlet for water to be softened, an inlet for regenerating solution and an inlet for wash water, separate valves to control the respective inlets, an actuating device to control the several valves, said actuating device having means for causing a single inlet only of each of said water softening devices to be opened at one time, and for actuating said valves in such relation one to the other that the inlet for water to be softened of one of said water softening devices will be open while the inlet for regenerating solution of another of said water softening devices is open and the inlet for wash water of still another of said water softening devices is open.

57. In a water softening mechanism, a series of water softening devices each comprising an inlet and an outlet for water to be softened, an inlet and an outlet for regenerating solution, and an inlet and an outlet for wash water, separate valves to control the respective inlets and outlets, and mechanically operated means for so actuating said valves that a single inlet of each of said water softening devices will be open at any one time.

58. In a water softening mechanism, a series of water softening devices each comprising an inlet and an outlet for water to be softened, an inlet and an outlet for regenerating solution, and an inlet and an outlet for wash water, separate valves to control the respective inlets and outlets, and mechanically operated means for so actuating said valves that the several inlets of each of said water softening devices will be successively opened.

59. In an apparatus of the character described, a water softening device, a conduit for hard water connected with said water softening device, a conduit for regenerating solution connected with said water softening device, valves to control the connections between said water softening device and the respective conduits, means to actuate said valves, a source of supply for regenerating solution connected with said regenerating solution conduit, a service pipe for soft water connected with said water softening device, and a device controlled by the flow of soft water through said service pipe to control the connection between said regenerating solution conduit and said source of supply for said regenerating solution.

60. In an apparatus of the character described, a water softening device, a conduit for hard water connected therewith, a conduit for regenerating solution connected with said water softening device, valves to control the connections between said water softening device and the respective conduits, means to actuate said valves, a source of supply for regenerating solution connected with said regenerating solution conduit, a discharge conduit for soft water connected with said water softening device, a valve for controlling the connection between said source of supply for regenerating solution and said regenerating solution conduit, a fluid pressure device for controlling said valve, and an operative connection between said fluid pressure device and said discharge conduit for soft water.

61. In an apparatus of the character described, a water softening device, a source of supply for hard water connected with said water softening device, a discharge conduit for soft water connected with said water softening device, a conduit for regenerating solution connected with said water softening device, valves to control the respective connections, means to actuate said valves, a controlling device comprising a housing, a diaphragm dividing said housing into two chambers, one of said chambers being connected with the discharge conduit for soft water and the other of said chambers being connected with said regenerating solution conduit, a valve to control the last mentioned connection, said valve being controlled by said diaphragm, a source of supply for regenerating solution, a mixer connected with said source of supply and with the source of supply for hard water and discharging into the last mentioned chamber of said housing, and a spring acting on said valve to hold the same on its seat.

62. In a water softening mechanism, a water softening device, a supply pipe for hard water and a supply pipe for regenerating solution, both connected with said water softening device, valves in said supply pipe and said regenerating solution pipe, outlet pipes for soft water and regenerating solution, both connected with said water softening device, a valve in the outlet pipe for regenerating solution, means for actuating said valves, and fluid operated means controlled by the liquid discharged through one of said outlet pipes to control the operation of said valve actuating means.

63. In a water softening mechanism, a series of water softening devices, means for connecting each of said water softening devices with a source of supply of water to be softened, with a source of supply of regenerating solution and with a source of supply of wash water, and mechanically operated means for so controlling said connecting means that while a part of said water softening devices is connected with said source of supply of regenerating solution another part of said water softening devices will be connected with the source of supply of wash water, and a third part of said water softening devices will be connected with a source of supply of water to be softened.

64. In a water softening mechanism, a series of water softening devices each having an inlet for water to be softened, an inlet for regenerating solution and an inlet for wash water, separate valves to control the respective inlets, an actuating device common to the valves of all of said water softening devices, said actuating device having means for opening a single inlet only of each of said water softening devices and for actuating said valves in such relation one to the other that water to be softened will be admitted to a part of said water softening devices while regenerating solution is being admitted to another part of said water softening devices and wash water is being admitted to a third part of said water softening devices.

65. In a water softening mechanism, a series of water softening devices, means for connecting each of said water softening devices with a source of supply of water to be softened, with a source of supply of regenerating solution and with a source of supply of wash water, and mechanically operated means for so controlling said connecting means that wash water will be delivered to a part of said water softening devices while regenerating solution is being delivered to another part of said water softening devices.

66. In a water softening mechanism, a series of water softening devices, means for connecting each of said water softening devices with a source of supply of water to be softened, with a source of supply of regenerating solution and with a source of supply of wash water, each of said water softening devices having an outlet connected with a drain conduit, a valve in each of said drain conduits, and means controlled by wash water discharged from one water softening device for opening the drain valve of another water softening device.

67. In a water softening mechanism, a series of water softening devices, means for connecting each of said water softening devices with a source of supply of water to be softened, with a source of supply of regenerating solution and with a source of supply of wash water, each of said water softening devices having an outlet connected with a drain conduit, a valve in each of said drain conduits, and means controlled by wash water discharged from one of said water softening devices for closing the drain valve of that water softening device and opening the drain valve of another water softening device.

In testimony whereof, I affix my signature hereto.

EDWARD T. TURNER.